US011341459B2

(12) United States Patent
Geldenhuys

(10) Patent No.: US 11,341,459 B2
(45) Date of Patent: May 24, 2022

(54) DIGITAL DATA MINUTIAE PROCESSING FOR THE ANALYSIS OF CULTURAL ARTEFACTS

(71) Applicant: ARTENTIKA (PTY) LTD, Randburg (ZA)

(72) Inventor: Albertus Barend Geldenhuys, Randburg (ZA)

(*) Notice: Subject to any disclaimer, the term of this patent is extended or adjusted under 35 U.S.C. 154(b) by 246 days.

(21) Appl. No.: 16/613,476

(22) PCT Filed: May 16, 2018

(86) PCT No.: PCT/ZA2018/050024
§ 371 (c)(1),
(2) Date: Nov. 14, 2019

(87) PCT Pub. No.: WO2018/213856
PCT Pub. Date: Nov. 22, 2018

(65) Prior Publication Data
US 2021/0042703 A1  Feb. 11, 2021

(30) Foreign Application Priority Data
May 16, 2017 (ZA) .................. 2017/03360
May 16, 2017 (ZA) .................. 2017/03362

(51) Int. Cl.
G06K 9/62         (2022.01)
G06Q 10/10       (2012.01)
G06Q 10/06       (2012.01)
G06V 10/40       (2022.01)
G06V 40/12       (2022.01)

(52) U.S. Cl.
CPC ............. G06Q 10/10 (2013.01); G06K 9/62 (2013.01); G06Q 10/06 (2013.01); G06V 10/40 (2022.01); G06V 40/1347 (2022.01); G06V 40/1365 (2022.01)

(58) Field of Classification Search
CPC .... G06Q 10/10; G06Q 10/06; G06K 9/00067; G06K 9/00087; G06K 9/46; G06K 9/62; G06V 10/40; G06V 40/1347; G06V 40/1365
See application file for complete search history.

(56) References Cited

U.S. PATENT DOCUMENTS

| 4,198,147 | A | * | 4/1980 | Alasia | G03B 35/00 355/52 |
| 5,078,501 | A | * | 1/1992 | Hekker | G01B 11/24 359/561 |
| 5,399,874 | A | * | 3/1995 | Gonsalves | G06K 7/14 250/556 |
| 6,173,068 | B1 | | 1/2001 | Prokoski | |
| 6,494,490 | B1 | * | 12/2002 | Trantoul | B41M 1/18 101/211 |
| 9,224,067 | B1 | | 12/2015 | Lu et al. | |
| 9,420,288 | B2 | | 8/2016 | Mertens | |
| 9,996,726 | B2 | * | 6/2018 | Chen | G06K 9/00067 |
| 2004/0158724 | A1 | | 8/2004 | Carr et al. | |
| 2005/0063562 | A1 | | 3/2005 | Brunk et al. | |
| 2007/0067345 | A1 | * | 3/2007 | Li | G06F 16/951 |
| 2008/0317378 | A1 | | 12/2008 | Steinberg et al. | |
| 2009/0244062 | A1 | | 10/2009 | Steedly et al. | |
| 2010/0014732 | A1 | * | 1/2010 | Vija | G06T 5/001 382/131 |
| 2010/0232676 | A1 | * | 9/2010 | Lee | G07D 7/128 382/135 |
| 2014/0313303 | A1 | * | 10/2014 | Davis | A61B 5/68 348/77 |

(Continued)

FOREIGN PATENT DOCUMENTS

| CN | 1564148 A | 1/2005 |
| CN | 101435826 A | 5/2009 |

(Continued)

OTHER PUBLICATIONS

Benko et al., Collaborative Mixed Reality Visualization of an Archaeological Excavation, IEEE International Symposium on Mixed and Augmented Reality; 2004, 9 pages.
Kampel et al., Automated Segmentation of Archaeological Profiles for Classification, International Conference on Pattern Recognition; 2002, 5 pages.
Kong et al., On Solving 2D and 3D Puzzles Using Curve Matching, IEEE Conference on Computer Vision and Pattern Recognition; 2001, 8 pages.
Papaioannou et al., Reconstruction of Three-Dimensional Objects through Matching of Their Parts, IEEE Transactions on Pattern Analysis and Machine Intelligence; Jan. 2002, 12 pages.

(Continued)

Primary Examiner — Aaron W Carter
(74) Attorney, Agent, or Firm — Grossman, Tucker, Perreault & Pfleger, PLLC

(57) ABSTRACT

This invention relates to means and processes of analysing cultural artefacts, for example to authenticate works of art or to reconstruct fragmented archaeological artefacts digitally, by first scanning the target artefact to produce a digital data model of the target artefact, which is then transformed algorithmically to obtain a target digital transform. This is analysed to identify and extract digital data minutiae from the digital transform data. Then, a number of comparator artefacts are scanned using the same scanning technologies to produce a digital data model of each comparator artefact. The same processes of algorithmic transformation and digital data minutiae extraction are applied to the comparator digital data models. An algorithmic comparison is then made between the target digital data minutiae and the comparator digital data minutiae to identify correlating comparator and target digital data minutiae in accordance with predetermined correlation criteria and the artefact is characterised according to the degree of correlation, for purposes of authentication or digital reconstruction, for example.

5 Claims, No Drawings

(56) References Cited

U.S. PATENT DOCUMENTS

| | | | |
|---|---|---|---|
| 2015/0161443 A1 | 6/2015 | Hanna | |
| 2016/0169818 A1* | 6/2016 | Martin | H01L 23/544 |
| | | | 702/81 |
| 2018/0060692 A1* | 3/2018 | Scholzen | G06T 7/0002 |
| 2018/0174390 A1* | 6/2018 | Jin | G07D 7/205 |
| 2018/0205548 A1* | 7/2018 | Cheng | G06Q 30/0185 |
| 2019/0074160 A1* | 3/2019 | Liddicoat | H01J 37/226 |
| 2019/0293620 A1* | 9/2019 | Farkas | G01N 21/65 |
| 2020/0023074 A1* | 1/2020 | Correia Dos Santos | ...... |
| | | | C23C 16/26 |
| 2020/0184171 A1* | 6/2020 | Lee | G06K 9/482 |
| 2020/0311452 A1 | 10/2020 | McConnell et al. | |
| 2020/0312075 A1* | 10/2020 | Kakkar | G06T 5/50 |
| 2021/0042703 A1* | 2/2021 | Geldenhuys | G06Q 10/10 |
| 2021/0089571 A1* | 3/2021 | Perone | G06F 40/30 |
| 2021/0158036 A1* | 5/2021 | Huber, Jr. | G06K 9/00456 |
| 2021/0350126 A1* | 11/2021 | Shibata | G06K 9/00348 |

FOREIGN PATENT DOCUMENTS

| | | |
|---|---|---|
| CN | 105243384 A | 1/2016 |
| CN | 106124508 A | 11/2016 |
| RU | 2014142986 A | 5/2016 |

OTHER PUBLICATIONS

Willis et al., Bayesian Assembly of 3D Axially Symmetric Shapes from Fragments, IEEE Conference on Computer Vision and Pattern Recognition, 2004, 9 pages.

Yifan Lu—Interactive Reconstruction of Archaeological Fragments in a Collaborative Environment, Digital Image Computing Techniques and Applications, 2007, IEEE, 8 pages.

International Search Report and Written Opinion dated Apr. 1, 2019, issued in PCT International Patent Application No. PCT/ZA2018/050024, 8 pages.

Zhang et al. "3D Fragment Reassembly using Integrated Template Matching Guidance and Fracture-Region Matching," 2015 IEEE International COnference on COmputer Vision (ICCV), 9 pages.

David Dobkin et al., A System for High-Volume Acquisition and Matching of Fresco Fragments; Reassembling Theran Wall Paintings, ACM Transactions of Graphics, vol. 27, No. 3, Article 84, Aug. 2008, 9 pages.

Extended Search Report in related European Application No. 18801981.4, dated Aug. 11, 2020.

Office Action from related European Appln. No. 18801981.4, dated Aug. 3, 2021.

English translation of Office Action from related Russian Appln No. 2019136626 (PCT/ZA2018/050024), dated Dec. 21, 2021.

* cited by examiner

DIGITAL DATA MINUTIAE PROCESSING FOR THE ANALYSIS OF CULTURAL ARTEFACTS

FIELD OF THE INVENTION

This invention relates to means and processes of analysing, reconstructing and authenticating cultural artefacts, including works of art.

BACKGROUND TO THE INVENTION

The biggest problems in the field of computer-assisted analysis of cultural artefacts arises from the amount of data generated by the systems and processes currently used.

The problem is amply illustrated by the systems and processes used in computer-assisted reassembly of three-dimensional archaeological artefacts from a collection of fragments. This is one of the major problems in archaeology and a substantial body of research is currently directed towards computer-assisted reassembly techniques.

Examples of such research are mentioned below. It will be appreciated that the proposals outlined below are purely exemplary of the many systems currently being developed for the reassembly of three-dimensional archaeological artefacts from a collection of fragments. These examples are neither exhaustive nor intended for use in interpreting this specification, the invention described herein or the scope of the invention.

Yifan Lu et al, summarise some of this research as focusing largely on either pattern-recognition or augmented visualisation.[1] They point out that a typical archaeological study involves archaeologists travelling to various archaeological sites to unearth artefacts. In order to analyse these artefacts, it is essential to classify and reconstruct complete artefacts from a potentially huge number of collected fragments and most archaeological studies are still manually completed in the field or a laboratory. Archaeologists need to classify thousands of pieces of fragments into hundreds of categories, and then find the fragments that originate from a specific artefact within a category. Following classification, a subsequent major challenge is the reassembly of fragments to restore the original artefacts. Commonly, archaeological fragments have been deformed as well as broken. They are often of similar texture and appearance. Such difficulties exacerbate the classification and reassembly problems.
[1] Interactive Reconstruction of Archaeological Fragments in a Collaborative Environment—Yifan Lu (Information Engineering, RSISE, CECS Australian National University) and others|IEEE—Digital Image Computing Techniques and Applications They refer to research into computer assistance for the reassembly problem including work by:

Willis and Cooper—a framework for automatically reassembling 3D pots given 3D measurements of fragments assuming that all of the pots have a symmetric axis;[2]
[2] A. R. Willis and D. B. Cooper. Bayesian assembly of 3D axially symmetric shapes from fragments—IEEE Conference on Computer Vision and Pattern Recognition, 2004.

Kong and Kimia—an automated method for 2D and 3D "jigsaw-puzzle" solving—their algorithm has two stages: local shape-matching followed by global search and reconstruction;[3]
[3] W. Kong and B. B. Kimia—On solving 2D and 3D puzzles using curve matching—IEEE Conference on Computer Vision and Pattern Recognition; 2001.

Papaioannou et al—focus on surface geometry—they use a global optimisation method to minimise an error measurement of the complementary matching between two object parts at a given relative pose, based on a point-by-point distance between the mutually-visible faces of the objects—performance relies on having highly-detailed or densely-sampled models and it also suffers from computational complexity;[4]
[4] G. Papaioannou, E.-A. Karabassi, and T. Theoharis—Reconstruction of three-dimensional objects through matching of their parts—IEEE Transactions on Pattern Analysis and Machine Intelligence; January 2002.

Kampel et al—they start with the estimation of the correct orientation of the fragment, leading to the exact position of a fragment on the original vessel and then classify the fragments based on their profile section—as the orientation of the candidate fragments is known, the alignment of two fragments is achieved in a two-degrees-of-freedom search space—they propose a matching algorithm based on the point-by-point distance between facing outlines;[5]
[5] M. Kampel and R. Sablatnig—Automated segmentation of archaeological profiles for classification—In R. Kasturi, D. Laurendeau, and C. Suen, editors—International Conference on Pattern Recognition; 2002.

Benko et al—a visual interaction system for archaeology that was introduced to establish an experimental, collaborative, mixed-reality system for allowing multiple users to do offsite simulation of archaeological excavation.[6]
[6] H. Benko, E. W. Ishak, and S. Feiner. Collaborative mixed reality visualization of an archaeological excavation—In IEEE International Symposium on Mixed and Augmented Reality; 2004.

Yifan Lu et al point out that existing approaches require either the use of additional information or strong constraints on the nature of the artefact and they go on to propose an approach from a different perspective: Because humans have some complementary and superior capabilities to computers in making a perceptual selection based on prior experience and knowledge, they deem it advantageous to combine both interactive and automatic approaches in one application in which:

In the first step, fragments are photographed using a high quality digital camera from different angles.

In the second step, photogrammetry software is used to produce 3D VRML models of the fragment and to extract the associated boundary curves.

The 3D VRML models are then imported to a dedicated software application and the boundary curves are transformed into curvature and torsion form.

In the next step, one boundary curve represented by curvature and torsion is matched with others using a cyclic edit distance algorithm.[7]
[7] The cyclic edit distance between two strings A and B of lengths m and n is the minimum edit distance between A and every cyclic shift of B. This can be applied, for instance, in classification tasks where strings represent the contour of objects.

A ranked list in order of descending matching likelihood is generated by comparing one target boundary curve with other boundary curves.

An archaeologist can view the fragments and select one boundary curve of interest from a fragment and find out which other fragments have a high probability of originating from the same artefact based on both the automatic ranking and their own expertise.

The dedicated software application is deployed on an Access Grid that allows several archaeologists to interactively reassemble artefacts together.[8]
[8] The Access Grid is a media communication platform that organises person-to-person (human) communication and associated information in a form-free style. The Access Grid provides networked virtual "space" within which archaeologists can represent archaeological data descriptively in a collaborative environment.

The Conceptual Architecture as described in Section 4. This paper is organised to follow the sequence of steps in the reconstruction problem described above. Experimental results, conclusion & future work are presented in Sections 5 and 6.

Kang Zhang Wuyi Yu et al classify existing 3D fragment reassembly algorithms differently: (1) reassembly—based on fracture-region matching, and (2) reassembly—using template guidance. Fracture-region matching approaches exploit similarities in the local fracture geometry of adjacent fragments whilst template guidance approaches compose fragmented pieces based on their best match to a complete model. They point out that each approach has advantages and limitations and reassembly algorithms in both categories report difficulty in effectively processing small fragmented pieces. First, with small fragments, it is particularly challenging to differentiate and segment intact and fracture regions. Second, the number of uncertain potential matches tends to be large and effective pruning is difficult. They go on to propose a reassembly pipeline integrating both template-guidance and fracture region matching, using the information from both intact and fracture regions to construct many potential matching relationships among the fragments and template and then, through a multi-piece matching optimisation, their process prunes and refines these possible matches to obtain globally consistent alignment of the fragments. The reassembly pipeline proposed is a 3-step pipeline: (1) initial reassembly guided by a template; (2) pairwise fracture matching between fragments; and (3) multi-piece matching integrating both intact and fracture information. The main technical contributions include (a) reliable pairwise matching algorithms to align fragments with small overlapping regions, and (b) a multi-piece matching and refinement algorithm effectively integrating both template guidance and pairwise fragment matchings, which iteratively optimises the positioning of fragments while consistently controlling accumulated error and avoiding penetrations.[9]

[9] 3D Fragment Reassembly using Integrated Template Guidance and Fracture Region Matching—Kang Zhang Wuyi Yu; School of Electrical Engineering and Computer Science, Louisiana State University; Mary Manhein, Dept. Geography & Anthropology, Louisiana State University; Warren Waggenspack, Dept. Mechanical & Industrial Engineering, Louisiana State University; Xin Li, School of Electrical Engineering and Computer Science Louisiana State University—IEEE Xplore.

Until the advent of computerised scanning and imaging technologies, none of this work would be possible. A representative example of these technologies is an automated system for reconstructing excavated fresco mosaics or similar archaeological objects developed by computer scientists from Princeton University and presented at the Association of Computing Machinery SIGGRAPH conference, Los Angeles, 2008.[10]

[10] Dobkin et al, Princeton Graphics Group, Princeton University

The setup used by the Princeton researchers consists of a flatbed scanner (of the type commonly used to scan documents and which scans the surface of the fragment), a laser rangefinder (essentially a laser beam that scans the width and depth of the fragment) and a motorised turntable (which allows for precise rotation of the fragment as it is being measured). These devices are connected to a laptop computer. By following a precisely defined sequence of actions, a conservator working under the direction of an archaeologist can use the system digitally to acquire fragment information. In the process, the flatbed scanner is first used digitally to acquire high resolution colour images of the fragment. Next, the fragment is placed on the turntable and the laser rangefinder measures its visible surface from various viewpoints. The fragment is then turned upside down and the process is repeated. Finally, computer algorithms are used, first to align the various partial surface measurements to create a complete and accurate three-dimensional image of the piece. Another analyses the scanned images to detect cracks or other minute surface markings that the rangefinder might have missed. The system then integrates all of the information gathered—shape, image and surface detail—into a data-rich record of each fragment.

It is this last aspect that raises one of the biggest problems in the reassembly of three-dimensional archaeological artefacts from a collection of fragments, namely the amount of data generated by systems and these processes. When it comes to analysing and matching small quantities of fragments, these systems perform adequately. However, the time needed to reassemble a large three-dimensional work becomes significant.

Essentially the same problem arises in the authentication of cultural artefacts constituted by works of art. Until the advent of computerised scanning and imaging technologies, a combination of provenance and stylistic analysis was used in an attempt to determine artwork authenticity. Now however, computer-assisted artwork analysis, together with advances in sensing and imaging technologies, more and more, involve the application of diverse scientific disciplines to the field of artwork analysis, including physics, chemistry and biochemistry.

Ironically, it is this proliferation of technologies that gives rise to the problem addressed by this invention, which is the generation of immense data sets that tend to render the use of multiple scanning, imaging and analysis technologies impractical.

SUMMARY OF THE INVENTION

According to this invention, a method of analysing a target cultural artefact comprises the steps of:
   scanning the target artefact by means of a multimodal digital imaging device configured to use a plurality of non-invasive imaging technologies to scan the artefact to any one or more of a photonic-, nano- or molecular level, each imaging technology being configured to produce a target digital data model of the artefact that is unique to that imaging technology;
   algorithmically transforming the target composite digital data model to obtain a target digital transform;
   analysing the target digital transform to identify and select target digital data minutiae from the data of the target digital transform, the minutiae being selected according to predetermined target artefact minutiae selection criteria;
   extracting and saving the selected target digital data minutiae to a target digital data store;
   scanning a plurality of comparator artefacts by means of the multimodal digital imaging device to produce a comparator digital data model of each of the comparator artefacts;
   algorithmically transforming each of the comparable digital data models to obtain, for each comparable digital data model, a comparator digital transform;
   analysing the comparator digital transforms to identify and select comparator digital data minutiae from the data of each comparator digital transform, the minutiae being selected according to the target artefact minutiae selection criteria;
   extracting and saving the comparator digital data minutiae to a comparator digital data store;
   algorithmically comparing the target digital data minutiae in the target digital data store to the comparator digital data minutiae stored in the comparator digital data store to identify comparator digital data minutiae that correlate with the target digital data minutiae in accordance with predetermined correlation criteria; and characterising the target artefact according to the degree of correlation.

The method of the invention could be applied to the authentication of an artwork, in which case the artwork to be authenticated will be the target artefact or artwork and the comparator artefacts must be drawn from a plurality of previously authenticated artworks of the artist who produced the target artwork.

According to this embodiment of the invention, a method of analysing a target cultural artefact comprises the steps of:

scanning the target artefact by means of a multimodal digital imaging device configured to use a plurality of non-invasive imaging technologies to scan the artefact to any one or more of a photonic-, nano- or molecular level, each imaging technology being configured to produce a digital data model of the artefact that is unique to that imaging technology;

combining the digital data models into a composite digital data model of the artefact;

algorithmically transforming the composite digital data model to obtain a digital transform;

analysing the digital transform to identify and select digital data minutiae from the data of the digital transform, the minutiae being selected according to predetermined target artefact minutiae selection criteria;

extracting and saving the selected digital data minutiae to a digital data store;

scanning a plurality of comparator artefacts constituted by authenticated artefacts of the artist who produced the target artefact by means of the multimodal digital imaging device to produce a comparator digital data model of each of the comparator artefacts;

algorithmically transforming each of the comparable digital data models to obtain, for each comparable digital data model, a comparator digital transform;

analysing the comparator digital transforms to identify and select comparator digital data minutiae from the data of each comparator digital transform, the minutiae being selected according to the target artefact minutiae selection criteria;

extracting and saving the comparator digital data minutiae to a comparator digital data store, which is essentially a database of digital data minutiae unique to that artist;

algorithmically comparing the target digital data minutiae in the target digital data store to the comparator digital data minutiae stored in the comparator digital data store to identify comparator digital data minutiae that correlate with the target digital data minutiae in accordance with predetermined correlation criteria which, in essence, is a comparison of the digital data minutiae of the target artefact to the digital data minutiae stored in the database of digital data minutiae unique to that artist; and reporting the target artefact as authentic if the comparison indicates correlation above a predetermined threshold between the target artefact digital data minutiae and the comparator digital data minutiae.

The invention includes artwork authentication apparatus comprising a multimodal digital imaging/scanning device, a digital data store and programmable logic means, the digital imaging device including a plurality of non-invasive imaging devices, each configured to use a different imaging technology to scan a target work of art and to produce a scanned digital data model of the target work that is unique to that imaging technology and the programmable logic means being programmed to:

combine the digital data models derived from each imaging device into a composite digital data model of the target work;

algorithmically transform the composite digital data model to obtain a digital transform;

analyse the digital transform to identify and select digital data minutiae within the data of the digital transform according to predetermined target work minutiae selection criteria; and to extract and save the selected digital data minutiae to the digital data store.

The artwork authentication apparatus programmable logic means is preferably programmed to compare the digital data minutiae of the target work to digital data minutiae stored in a database of digital data minutiae unique to that artist, the database being populated with digital data minutiae data previously obtained by scanning and algorithmically obtaining, from each of a plurality of authenticated works of the artist who produced the target work, digital data minutiae selected according to the predetermined target work minutiae selection criteria to produce the database of digital data minutiae unique to that artist.

In this form of the invention, the artwork authentication apparatus may include means to report the target work as authentic if the comparison indicates a similarity above a predetermined threshold between the target work digital data minutiae and the database digital data minutiae.

Whilst these embodiments of the invention are described with reference to the authentication of artwork, it will be appreciated that the invention might find application in environments other than art, such as the identification and authentication of rare, scarce or expensive items, such as luxury goods, for instance.

Biochemistry and particularly genetic analysis can be used in the place of or in addition to imaging technologies for computer-assisted artefact analysis.

In such an embodiment of the invention, the method of analysing a target cultural artefact may comprise the steps of:

producing a target digital data model by obtaining, from the material of the target artefact, a sample of material containing DNA of the actual creator of the artefact (the person whose DNA is inevitably embedded in the material of the artefact during creation of the artefact), subjecting the sample to DNA analysis in which DNA derived from the artefact is extracted from the sample and actual creator-derived DNA is isolated and analysed and digitising the result of the actual creator-derived DNA analysis to produce a target digital data model from the actual creator DNA;

algorithmically transforming the target digital data model to obtain a target digital transform;

analysing the target digital transform to identify and select target digital data minutiae from the data of the target digital transform, the minutiae being selected according to predetermined target artefact minutiae selection criteria;

extracting and saving the selected target digital data minutiae to a target digital data store;

producing a comparator digital data model by obtaining a DNA sample from the purported creator of the artefact (the person claimed to be the creator of the artefact), from the environment of the purported creator of the artefact, subjecting the sample to DNA analysis in which DNA derived from the purported creator is isolated and analysed and digitising the result of the purported creator-derived DNA analysis to produce a target digital data model from the purported creator DNA;

algorithmically transforming the digital data model to obtain a target digital transform;

analysing the comparator digital transforms to identify and select comparator digital data minutiae from the data of each comparator digital transform, the minutiae being selected according to the target artefact minutiae selection criteria;

extracting and saving the comparator digital data minutiae to a comparator digital data store;

algorithmically comparing the target digital data minutiae in the target digital data store to the comparator digital data minutiae stored in the comparator digital data store and to a database of digital DNA data unrelated to either, such as a publicly available genomic, to identify comparator digital data minutiae that correlate with the target digital data minutiae in accordance with predetermined correlation criteria; and characterising the target artefact according to the degree of correlation.

Classification of the artwork-related DNA is done by comparing the artwork-related DNA to DNA data available in a number of DNA and genomic databases, public as well as private. In the process, the artwork-related DNA is classified, first, as human, animal or vegetal DNA and then according to known DNA classification procedures to produce DNA data for each of the collected samples.

In an application of this method to artwork authentication, the target artefact is preferably characterised by reporting the target artefact as authentic if the algorithmic comparison—essentially a DNA comparison—demonstrates that the correlation between the DNA of the purported creator and that of the actual creator indicates a high statistical probability that the purported creator cannot be excluded as the direct or indirect source of the DNA extracted from the artwork—essentially the actual creator's DNA.

The invention can be applied to the digital reassembly of three-dimensional artefacts from a collection of artefact fragments.

In this embodiment of the invention, a method of digitally reassembling a three-dimensional artefact from a collection of fragments of that artefact comprises the steps of:

producing a target digital data model in respect of each of the fragments to be reassembled, by means of a multimodal digital imaging device configured to use a plurality of non-invasive imaging technologies to scan the fragment to any one or more of a photonic-, nano- or molecular level, each imaging technology being configured to produce a target digital data model of each artefact that is unique to that imaging technology;

algorithmically assembling the target digital data model of each fragment into a three-dimensional composite digital data model in respect of that fragment;

algorithmically transforming the target three-dimensional composite digital data models to obtain a target digital transform in respect of each fragment;

analysing the target digital transforms to identify and select, in respect of each target digital transform, digital data minutiae from the data of the target digital transform, the minutiae being selected according to predetermined target fragment minutiae selection criteria;

extracting and saving the selected digital data minutiae in respect of each target digital transform to a target digital data store as target digital data minutiae pertaining to that transform;

algorithmically replicating the target digital data minutiae of each target digital transform to produce, in respect of each target fragment, a duplicate comparator digital transform together with corresponding comparator digital data minutiae pertaining to that transform;

algorithmically comparing the digital data minutiae of the target digital transforms to the digital data minutiae of the comparator digital transforms to identify comparator digital data minutiae that correlate with the target digital data minutiae in accordance with predetermined correlation criteria; and grouping the target and comparator digital data models into groups, depending on correlation, in which each group constitutes a three-dimensional composite digital model comprising a plurality of fragment digital models, digitally assembled into at least a part of the artefact.

The digital reassembly method may conveniently include a process of iteratively repeating the comparison and grouping steps, progressively to reassemble an at least partially complete three-dimensional artefact from a collection of fragments of that artefact.

The artefact to be reassembled might be constituted by a target artefact of which at least some of the characteristics are known.

For such artefacts, the method of the invention may conveniently be adapted to a form of reassembly approximating a template guidance approach, the method including, in the step of grouping the digital data models, the specific steps of grouping at least some of the digital data models based on their best match to a complete model.

The digital reassembly method may, further, include the steps of reversing the minutiae extraction and digital transform processes after complete or partial digital reassembly of the artefact:

algorithmically to reconstitute the digital transform from the selected minutiae;

algorithmically to transform the digital transform, digitally to reconstitute the composite digital data model of each fragment after reassembly of that fragment into a greater whole; and progressively to reassemble the artefact using digitally reconstituted digital data models of the reassembled fragments.

It will be appreciated that, in practice, there can never be any certainty that all the fragments in a collection of fragments are derived from a single artefact. On the contrary, the opposite is probably true, and it will normally be assumed that a given collection of fragments is derived from more than one artefact or might even include fragments of material not derived from any artefact.

To this end, the method of the invention preferably includes the additional step, in the step of comparing the digital data minutiae of the digital models in the data store to one another, of identifying, in respect of at least some of the data models, minutiae that are not complemental to the minutiae of any one of the other data models and grouping digital data models with non-complemental minutiae into a group of potentially non-relevant data models.

The potentially non-relevant data models, in all probability, are data models of fragments not derived from the target artefact.

In the preferred form of the invention, the method of the invention is a method of digitally reassembling a three-dimensional archaeological artefact from a collection of fragments of that artefact.

The invention includes apparatus for digitally analysing and reassembling three-dimensional artefacts from a collection of fragments, the apparatus comprising a multimodal digital imaging/scanning device, a digital data store and programmable logic means, the digital imaging device including a plurality of non-invasive imaging devices, each configured to use a different imaging technology to scan fragments potentially derived from a target artefact and to produce a scanned digital data model of each fragment that is unique to that imaging technology and the programmable logic means being programmed:
- algorithmically to transform the composite digital data model to obtain a digital transform;
- to analyse the digital transform to identify and select digital data minutiae from the data of the digital transform according to predetermined target fragment minutiae selection criteria;
- to extract and save the selected digital data minutiae to a digital data store;
- algorithmically to compare the digital data minutiae of the digital models in the data store to one another and identify, in respect of all or some data models, minutiae in one data model that are complemental to the minutiae of at least one other data model; and
- to group digital data models with complemental minutiae into groups.

The apparatus is preferably an apparatus for digitally analysing and reassembling three-dimensional archaeological artefacts from a collection of archaeological artefact fragments.

The multimodal imaging device of the invention is preferably a portable device that allows in situ scanning of artefacts and fragments of artefacts, for instance in a museum or warehouse, or in the office or residence of the owner of the artwork.

DESCRIPTION OF EMBODIMENTS OF THE INVENTION

The invention will be described with reference to specific examples, including the computer-assisted analysis of cultural artefacts applied to the authentication of artwork to determine the origin or authorship of the work of art and to reassembly of three-dimensional archaeological artefacts from a collection of fragments. It will be appreciated that this is done purely by way of example and is not intended to restrict the invention to such examples.

Computer-assisted authentication of an item or work, such as a work of art, first requires the acquisition of a digital image of the work, which acquisition is done by means of the composite imaging device of the invention.

Since, generally, original works are analysed, the imaging devices make use of non-destructive, non-invasive scanning and imaging techniques, and use hardware and methodologies that extract molecular and other information from works of art without any contact with the object.

The multimodal imaging device of the invention is preferably a portable device that allows in situ scanning of artworks, for instance in a museum or warehouse, or in the office or residence of the owner of the artwork.

The multimodal imaging device incorporates a number of imaging devices, which include a number of specialised, high-speed and 3-D cameras, as well as other non-destructive digital imaging or scanning devices, notably spectroscopes, laser devices and a nephelometer. The imaging device is preferably configured for a complete, multi-modal scan of an artwork to be completed in a matter of minutes.

Physically, the imaging device is preferably constructed to be portable and to include on-board computing capacity as well as adequate data storage facilities. Preferably, the imaging device also disposes of GSM and Wi-Fi connectivity to upload scans to a processing laboratory remote from the scanning site. The device is preferably battery-powered, but may include mains power connectivity to enable multiple scans over extended periods of time.

Digital imaging is normally classified by the waveform of the imaging device, which waveforms include electromagnetic radiation and other waves, such as sound waves. The variable attenuation of the waveforms, as they pass through or reflect off objects, convey the information that constitutes the image. In all classes of digital imaging, the information is converted by image sensors into digital signals that are processed by a computer.

Digital imaging lends itself to image analysis and manipulation by software.

For most works of art, the multimodal scanner will include at least one scanning device capable of acquiring a digital image of the work in at least (but not limited to) the visual spectrum, which allows digital photography with various kinds of digital cameras.

The imaging devices could also include sound wave imaging devices.

In addition, the multimodal scanner may include one or more scanners capable of acquiring multispectral images of the target artwork, each including image data at specific frequencies across the electromagnetic spectrum and including electromagnetic radiation from frequencies beyond the visible light range, such as infrared and ultraviolet.

Alternative scanning technologies might include Reflectance Transformation Imaging (RTI), photogrammetry and various laser scanning techniques to record three-dimensional data of the artwork surface, including deep and shallow relief, such as the 3-D topographical terrain of textured brushwork.

In addition, the imaging and spectroscopic techniques may include VIS-NIR reflectance spectroscopy and multispectral imaging, micro-Raman spectroscopy, X-ray fluorescence spectroscopy (XRF) and optical coherence tomography (OCT). The three spectroscopic techniques complement each other in pigment identification. Multispectral imaging (near-infrared bands), OCT and micro-Raman complement each other in the visualisation and identification of painting and drawing material. OCT probes the microstructure and light scattering properties of the substrate, while XRF detects the elemental composition that indicates the sizing methods and the filler content.

The advantage of multimodal imaging is that it gives rise to complementary information (digital data) pertaining to the artwork.

In the authentication process of the invention, heterogeneous but nevertheless complementary data is combined into a composite digital data model. It will be appreciated, however, that the composite digital data model arising from multimodal imaging of even a relatively small artwork will give rise to a substantial amount of data.

To reduce data storage and processing requirements, the imaging process of the invention makes use of an algorithmic transformation process, using an algorithm to produce a data transform in which data relationships are maintained, but the quantity of data is substantially reduced compared to the data making up the composite digital data model. By analogy, the transform constitutes a cross-section through the data set of the composite digital data model.

Further to reduce the data set, the digital transform is then analysed, in the authentication process of the invention, to identify a number of digital characteristic points or minutiae.

The digital data minutiae, so identified, bear little relation to the actual characteristic points recorded in the artwork and, instead, constitute important patterns or deviations from patterns occurring in the data.

This differs from current computer-assisted authentication techniques, most of which seek to find analogous minutiae in the artwork itself. These techniques constitute little more than variations on pre-computerised stylistic analysis, particularly so-called Morellian analysis. The Morellian analysis techniques seek to identify the characteristic "hand" of the artist through scrutiny of diagnostic minor details that reveal the artist's scarcely conscious shorthand and conventions for portraying minor stylistic features. Other, similar techniques analyse even more subconscious features, such as the number of brushstrokes that an artist might make as opposed to a copyist who might make a substantially greater number of brushstrokes to achieve the same effect.

In biometrics and forensic science, minutiae are major features of a biometric feature, such as a fingerprint, which can be used to make comparisons of similar features. In these sciences, certain key features are used to assess the suitability of any trait for use in biometric authentication.

A number of these key features are also applicable in determining the suitability of digital and particularly quantum minutiae for the purposes of authentication of an artwork.

These key features include but are not limited to the following:

Universality: Every single one of the artist's works possesses this trait;

Uniqueness: This trait is sufficiently different for different artists such that the traits of one artist can be distinguished with ease from the traits of another;

Permanence: Certain artistic traits will be invariant over time, independent of the artist's creative period and varying styles during his lifetime; and measurability (collectability)—relates to the ease of acquisition or measurement of the trait and, in the acquired data, the trait should be in a form that permits subsequent processing and extraction of data pertaining to the trait.

The process of digital data minutiae analysis includes sub-processes of minutiae extraction and false-minutiae removal.

This process is repeated with a number of authenticated works produced by the artist who produced the target work.

Each authenticated work is scanned by means of the multimodal scanner and a composite digital data model of each authenticated work is produced. The transform algorithm is applied to each such composite digital data model to obtain a digital transform for each work, which is then analysed to identify and select digital data minutiae from the data of the digital transform, the minutiae being selected according to exactly the same minutiae selection criteria used in respect of the target work. In each case, the digital data minutiae are extracted and collected in a database to produce a database of digital data minutiae unique to that artist.

In a final step, the digital data minutiae of the target work are compared to the digital data minutiae stored in the database of digital data minutiae unique to that artist.

If the comparison indicates a correspondence between digital data minutiae of the target work and the digital data minutiae stored in the database greater than a predetermined threshold value, the target work is classified as authentic. If not, the target work is classified as non-authentic.

Applied to the field of biochemistry and genetics, DNA analysis can be used in the place of or in addition to imaging technologies for computer-assisted artefact analysis and artwork authentication in particular.

Classification of the artwork-related DNA is done by comparing the artwork-related DNA (actual creator and purported creator DNA obtained from the artwork, the actual creator, if available and the actual creator's environment, if accessible) to DNA data available in a number of DNA and genomic databases, public as well as private. In the process, the artwork-related DNA is classified, first, as human, animal or vegetal DNA and then according to known DNA classification procedures to produce DNA data for each of the collected samples.

In the step of obtaining DNA-containing material from the target work, preferably a plurality of samples of DNA-containing material are obtained.

The step of obtaining DNA-containing material from the artwork is preferably undertaken in accordance with a predetermined protocol by trained personnel using appropriate technology, preferably an integrated mobile analysis platform including means to scan for and detect potentially DNA-containing material and means to remove one or more samples of the DNA-containing material so detected.

In many cases, the target artwork will have substantial value and the step of obtaining DNA-containing material from the artwork, therefore, will be undertaken in accordance with a protocol acceptable to and agreed with the owner of the artwork, at the location of the artwork or other premises acceptable to the artwork owner, and under the supervision of the artwork owner and/or his agents or representatives.

In the preferred form of the invention, the DNA-containing material obtained from the artwork will be removed as microscopic samples of material, the sampling being invisible to the naked eye and as close to non-destructive as possible.

In the DNA analysis step, the collected sample or samples removed from the artwork are preferably transferred to a laboratory housing DNA detection, isolation and extraction apparatus, as well as other forensic equipment, by means of which the artwork-related DNA (the DNA present in the collected samples) may be extracted, classified and catalogued.

Classification of the artwork-related DNA is done by comparing the artwork-related DNA to DNA data available in a number of DNA and genomic databases, public as well as private. In the process, the artwork-related DNA is classified, first, as human, animal or vegetal DNA and then according to known DNA classification procedures to produce DNA data for each of the collected samples.

Combining the artwork-related DNA data from a multiplicity of the collected samples, a DNA profile of the artwork is compiled and stored.

To obtain creator-related DNA, DNA-containing material is sourced from the artist (if the artist is still alive or from the artist's mortal remains), from one or more authentic and non-contentious works of the artist, and possibly also from the artist's studio or from other environments that the artist is known to have frequented.

In the laboratory, the creator-related DNA is extracted, classified and catalogued, similar to the manner in which the artwork-related DNA is extracted, classified and catalogued. The data pertaining to the artist's DNA is then combined and stored as a creator-related DNA profile.

Finally, the artwork-related DNA profile of the target artwork is compared to the creator-related DNA profile.

If the comparison demonstrates that the creator-related DNA cannot be excluded as the source of the artwork-related DNA, the target work is classified as authentic. If not, the target work is classified as non-authentic.

Applied to the digital reassembly of three-dimensional artefacts from a collection of artefact fragments, similar apparatus and processes are used.

The fragment reassembly apparatus is preferably an apparatus for digitally analysing and reassembling three-dimensional archaeological artefacts from a collection of archaeological artefact fragments that uses a multimodal imaging device and preferably a portable device that allows in situ scanning of artefacts and fragments of artefacts, for instance in a museum or warehouse, or in the office or residence of the owner of the artwork.

The multimodal imaging device incorporates a number of imaging devices, which include a number of specialised, high-speed and 3-D cameras, as well as other non-destructive digital imaging or scanning devices, notably spectroscopes, laser devices and a nephelometer. The imaging device is preferably configured for a complete, multi-modal scan of an artwork to be completed in a matter of minutes.

Physically, the imaging device is preferably constructed to be portable and to include on-board computing capacity as well as adequate data storage facilities. Preferably, the imaging device also disposes of GSM and Wi-Fi connectivity to upload scans to a processing laboratory remote from the scanning site. The device is preferably battery-powered, but may include mains power connectivity to enable multiple scans over extended periods of time.

Digital imaging is normally classified by the waveform of the imaging device, which waveforms include electromagnetic radiation and other waves, such as sound waves. The variable attenuation of the waveforms, as they pass through or reflect off objects, convey the information that constitutes the image. In all classes of digital imaging, the information is converted by image sensors into digital signals that are processed by a computer.

Digital imaging lends itself to image analysis and manipulation by software.

For most artefacts, the multimodal scanner will include at least one scanning device capable of acquiring a digital image of the artefact fragments in at least (but not limited to) the visual spectrum, which allows digital photography with various kinds of digital cameras.

The imaging devices could also include sound wave imaging devices.

In addition, the multimodal scanner may include one or more scanners capable of acquiring multispectral images of the artefact fragments, each including image data at specific frequencies across the electromagnetic spectrum and including electromagnetic radiation from frequencies beyond the visible light range, such as infrared and ultraviolet.

Alternative scanning technologies might include Reflectance Transformation Imaging (RTI), photogrammetry and various laser scanning techniques to record three-dimensional data of the artwork surface, including deep and shallow relief, such as the 3-D topographical terrain of the artefact fragment.

In addition, the imaging and spectroscopic techniques may include VIS-NIR reflectance spectroscopy and multispectral imaging, micro-Raman spectroscopy, X-ray fluorescence spectroscopy (XRF) and optical coherence tomography (OCT). The three spectroscopic techniques complement each other in pigment identification. Multispectral imaging (near-infrared bands), OCT and micro-Raman complement each other in the visualisation and identification of painting and drawing material. OCT probes the microstructure and light scattering properties of the substrate, while XRF detects the elemental composition that indicates sizing methods and the filler content.

The advantage of multimodal imaging is that it gives rise to complementary information (digital data) pertaining to the artefact fragments.

In the authentication process of the invention, heterogeneous but nevertheless complementary data is combined into a composite digital data model. It will be appreciated, however, that the composite digital data model arising from multimodal imaging of even a relatively small artefact will give rise to a substantial amount of data.

To reduce data storage and processing requirements, the imaging process of the invention makes use of an algorithmic transformation process, using an algorithm to produce a data transform in which data relationships are maintained, but the quantity of data is substantially reduced compared to the data making up the composite digital data model. By analogy, the transform constitutes a cross-section through the data set of the composite digital data model.

Further to reduce the data set, the digital transform is then analysed, in the digital reassembly process of the invention, to identify a number of digital characteristic points or minutiae.

The digital data minutiae so identified bear little relation to the actual characteristic points recorded in the artefact fragments and, instead, constitute important patterns or deviations from patterns occurring in the data.

This differs from current computer-assisted digital fragmentary artefact reassembly techniques, most of which seek to find analogous minutiae in the fragments. These techniques constitute little more than variations on pre-computerised, manual reassembly techniques, based on visual and tactile pattern recognition and fragment matching.

Whilst this embodiment of the invention is described with reference to the reassembly and reconstruction of archaeological artefacts, it will be appreciated that the invention might find application in environments other than archaeology. To name but a few examples, the invention could find application in the reassembly and reconstruction of human and animal remains, particularly skeletons, in archaeology and forensics. To this end, the term "artefact" should be given a wider interpretation and simply an archaeological artefact and the term "fragment" should, likewise, be given an interpretation wider than simply a fragment of an archaeological artefact.

What is claimed is:

1. A method of analysing a target artefact comprising:
    scanning the target artefact by means of a multimodal digital imaging device configured to use a plurality of non-invasive imaging technologies to scan the artefact to any one or more of a photonic-, nano- or molecular level, each imaging technology being configured to produce a target digital data model of the target artefact that is unique to that imaging technology;
    combining the plurality of target digital data models into a composite digital data model of the target artefact;
    algorithmically transforming the target composite digital data model to obtain a target digital transform;
    analysing the target digital transform to identify and select target digital data minutiae from data associated with of the target digital transform, the target digital data minutiae being selected according to predetermined target artefact minutiae selection criteria;

extracting and saving the selected target digital data minutiae to a target digital data store;

scanning a plurality of comparator artefacts by means of the multimodal digital imaging device to produce a comparator digital data model of each of the comparator artefacts;

algorithmically transforming each of the comparable digital data models to obtain, for each comparable digital data model, a comparator digital transform;

analysing the comparator digital transforms to identify and select comparator digital data minutiae from data associated with each comparator digital transform, the comparator digital data minutiae being selected according to the target artefact minutiae selection criteria;

extracting and saving the comparator digital data minutiae to a comparator digital data store;

algorithmically comparing the target digital data minutiae in the target digital data store to the comparator digital data minutiae stored in the comparator digital data store to identify comparator digital data minutiae that correlate with the target digital data minutiae in accordance with predetermined correlation criteria; and characterising the target artefact according to a degree of correlation between the comparator digital data minutiae and the target digital data minutiae.

2. A method for authentication of a target artwork, the target artwork to be authenticated being a target artefact and comparator artefacts being obtained from a plurality of previously authenticated artworks of an artist who produced the target artwork, the method comprising the steps of:

scanning the target artefact by means of a multimodal digital imaging device configured to use a plurality of non-invasive imaging technologies to scan the target artefact to any one or more of a photonic-, nano- or molecular level, each imaging technology being configured to produce a digital data model of the artefact that is unique to that imaging technology;

combining the digital data models into a composite digital data model of the target artefact;

algorithmically transforming the composite digital data model to obtain a digital transform;

analysing the digital transform to identify and select digital data minutiae from data associated with the target digital transform, the minutiae being selected according to predetermined target artefact minutiae selection criteria;

extracting and saving the selected digital data minutiae to a digital data store;

scanning a plurality of comparator artefacts constituted by authenticated artefacts of the artist who produced the target artefact by means of the multimodal digital imaging device to produce a comparator digital data model of each of the comparator artefacts;

algorithmically transforming each of the comparable digital data models to obtain, for each comparable digital data model, a comparator digital transform;

analysing the comparator digital transforms to identify and select comparator digital data minutiae from data associated with each comparator digital transform, the comparator digital data minutiae being selected according to the target artefact minutiae selection criteria;

extracting and saving the comparator digital data minutiae to a comparator digital data store, which includes a database of digital data minutiae unique to the artist;

algorithmically comparing the target digital data minutiae in the target digital data store to the comparator digital data minutiae stored in the comparator digital data store to identify comparator digital data minutiae that correlate with the target digital data minutiae in accordance with predetermined correlation criteria which includes a comparison of the digital data minutiae of the target artefact to the digital data minutiae stored in the database of digital data minutiae unique to the artist; and reporting the target artefact as authentic if the comparison indicates correlation above a predetermined threshold between the target artefact digital data minutiae and the comparator digital data minutiae.

3. Artwork authentication apparatus comprising a multimodal digital imaging/scanning device, a digital data store and programmable logic, the digital imaging device including a plurality of non-invasive imaging devices each configured to use a different imaging technology to scan a target work of art and to produce a scanned digital data model of the target work of art that is unique to that imaging technology, wherein the programmable logic is configured to:

combine digital data models derived from each imaging device into a composite digital data model of the target work of art;

algorithmically transform the composite digital data model to obtain a digital transform;

analyse the digital transform to identify and select digital data minutiae within data associated with of the digital transform according to predetermined target work minutiae selection criteria; and extract and save the selected digital data minutiae to the digital data store.

4. The apparatus of claim 3 in which the programmable logic is programmed to compare the digital data minutiae of the target work of art to digital data minutiae stored in a database of digital data minutiae unique to an artist, the database being populated with digital data minutiae data previously obtained by scanning and algorithmically obtaining, from each of a plurality of authenticated works of the artist who produced the target work of art, digital data minutiae selected according to the predetermined target work minutiae selection criteria to produce the database of digital data minutiae unique to the artist.

5. The apparatus of claim 4 including means to report the target work of art as authentic if the comparison indicates a similarity above a predetermined threshold between the target work digital data minutiae and the database digital data minutiae.

* * * * *